(12) United States Patent
Pan

(10) Patent No.: US 8,142,671 B1
(45) Date of Patent: Mar. 27, 2012

(54) METHOD TO FABRICATE A DAMPED SUSPENSION ASSEMBLY

(75) Inventor: Tzong-Shii Pan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 897 days.

(21) Appl. No.: 12/190,377

(22) Filed: Aug. 12, 2008

(51) Int. Cl.
*B22C 1/22* (2006.01)
*G11B 5/48* (2006.01)

(52) U.S. Cl. ............. 216/22; 216/39; 216/83; 216/100; 29/603.03; 360/244.2

(58) Field of Classification Search ........................ None
See application file for complete search history.

(56) References Cited

U.S. PATENT DOCUMENTS

| | | | |
|---|---|---|---|
| 4,760,478 A * | 7/1988 | Pal et al. ................ | 360/244.3 |
| 5,187,625 A | 2/1993 | Blaeser et al. | |
| 5,461,525 A * | 10/1995 | Christianson et al. ..... | 360/244.8 |
| 5,606,477 A | 2/1997 | Erpelding et al. | |
| 5,623,758 A | 4/1997 | Brooks, Jr. et al. | |
| 5,796,553 A * | 8/1998 | Tangren ................... | 360/244.9 |
| 5,796,554 A | 8/1998 | Berding et al. | |
| 5,875,072 A | 2/1999 | Brooks, Jr. et al. | |
| 5,894,381 A | 4/1999 | Allen et al. | |
| 5,894,655 A * | 4/1999 | Symons ...................... | 29/603.03 |
| 6,005,750 A | 12/1999 | Willard et al. | |
| 6,028,742 A | 2/2000 | Kazama | |
| 6,307,715 B1 | 10/2001 | Berding et al. | |
| 6,498,704 B1 | 12/2002 | Chessman et al. | |
| 6,532,135 B1 | 3/2003 | Chen et al. | |
| 6,594,114 B1 * | 7/2003 | Suzuki et al. .............. | 360/244.3 |
| 6,687,091 B1 | 2/2004 | Chen et al. | |
| 6,700,747 B2 | 3/2004 | Matz | |
| 6,731,466 B2 * | 5/2004 | Arya .......................... | 360/244.3 |
| 6,778,362 B1 | 8/2004 | Davis et al. | |
| 7,038,885 B2 | 5/2006 | Erpelding | |
| 7,050,267 B2 | 5/2006 | Koh et al. | |
| 7,054,109 B2 | 5/2006 | Erpelding | |
| 7,064,931 B2 | 6/2006 | Hutchinson | |
| RE39,478 E | 1/2007 | Hatch et al. | |
| 7,209,325 B2 | 4/2007 | Boutaghou et al. | |
| 7,224,554 B2 | 5/2007 | Wright | |
| 7,293,348 B2 | 11/2007 | Erpelding | |
| 7,301,729 B2 | 11/2007 | Wada et al. | |
| 7,551,400 B2 * | 6/2009 | Renken et al. ............. | 360/244.9 |
| 2005/0135013 A1 | 6/2005 | Sassine et al. | |
| 2010/0208389 A1 * | 8/2010 | Ikeji .......................... | 360/244.2 |

* cited by examiner

*Primary Examiner* — Anita Alanko

(57) ABSTRACT

A method to fabricate a damped suspension assembly includes providing a suspension assembly including a mounting plate, a bend region, and a load beam. A first thinned area of the load beam is partially-etched. The bend region does not include the first thinned area. A constrained-layer damper is adhered to the first thinned area of the load beam without being adhered to the bend region.

17 Claims, 6 Drawing Sheets

700

702 — Partially etch a first thinned area of a load beam.

Assemble the load beam into a suspension assembly including a mounting plate and a bend region, the bend region not including the first thinned area. 714

Adhere a constrained-layer damper to the first thinned area of the load beam without adhering the constrained-layer damper to the bend region. 726

*Fig. 7*

METHOD TO FABRICATE A DAMPED SUSPENSION ASSEMBLY

FIELD OF THE INVENTION

The present invention relates generally to information storage devices, and in particular to suspension assemblies used for supporting heads in information storage devices.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle and for controlling the position of the HSA, and for providing a data transfer channel between the disk drive and its host.

The spindle typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle hub results in rotation of the mounted disks.

The head stack assembly typically includes an actuator, at least one head gimbal assembly (HGA), and a flex cable assembly. Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. Because of the narrowness of contemporary information tracks and the speed with which the disks are rotated, the heads must be actively positioned (by the actuator) with acceptable bandwidth to quickly and reliably read and write data.

The head is adhered to a suspension assembly that includes a gimbal, load beam, bend region, and swage plate. The bend region of the suspension assembly has important mechanical properties that must be carefully controlled. For example, in a vertical direction the bend region serves as a spring (that is significantly more compliant than the load beam), to preload the head against the surface of the disk, yet allow the head (and more rigid load) beam to follow vertical undulation of the disk as it rotates. However, in a horizontal direction the bend region must be stiff so that the actuator can accurately position the load beam and head adjacent desired tracks of information on the disk. During operation, the head is typically separated from the disk by an extremely thin layer of ambient gas known as the "air bearing." This air bearing separation may enable the disk drive to function reliably for an acceptable period of time without damage or unacceptable wear to the disk or head from friction and rubbing contact.

However, high rotational accelerations of the actuator and externally applied mechanical shocks may excite undesired vibration modes of the suspension assembly. Such ringing of the suspension assembly may interfere with actuator control of the position of the head, adversely affecting operation of the disk drive, and also may cause an undesired or unacceptable amount of contact between the head and the disk—which, in turn, may lead to tribological problems and increased possibility of head crash and head-disk interface unreliability.

One method known in the art to control suspension assembly vibration in information storage devices is to adhere a constrained-layer damper to the suspension assembly. However, certain disadvantages have also been associated with adhering a constrained-layer damper to the suspension assembly. For example, there has typically been a large engineering uncertainty in the relative position of the constrained-layer damper during manufacture of the HGA. If a portion of the constrained-layer damper is adhered to the bend region of the suspension assembly, then the positional uncertainty of the constrained-layer damper can undesirably variably affect the important mechanical properties of the bend region. However, if the constrained-layer damper is alternatively positioned entirely on the more rigid load beam, then the strain energy imparted to the constrained-layer damper may be insufficient to adequately control suspension assembly vibration.

Thus, there is a need in the art for an improved method to control suspension assembly vibration in information storage devices.

SUMMARY

A method to fabricate a damped suspension assembly includes providing a suspension assembly including a mounting plate, a bend region, and a load beam. A first thinned area of the load beam is partially-etched. The bend region does not include the first thinned area. A constrained-layer damper is adhered to the first thinned area of the load beam without being adhered to the bend region.

BRIEF DESCRIPTION OF THE DRAWINGS

FIG. 7 is a flow chart of a method according to an embodiment of the invention.

DESCRIPTION OF THE PREFERRED EMBODIMENTS

Figure 1:
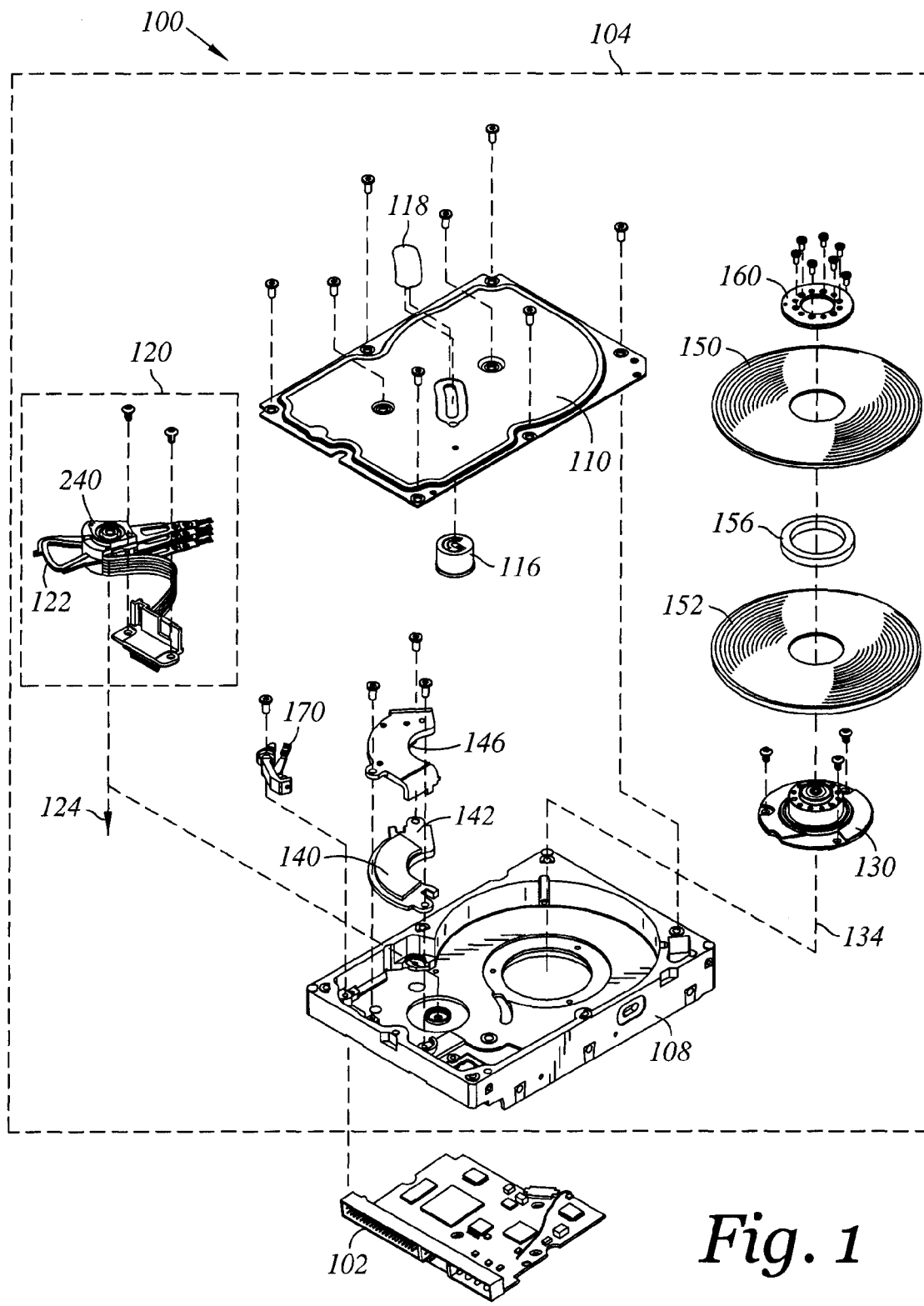
FIG. 1 depicts an exploded perspective view of a disk drive capable of including an embodiment of the invention.

FIG. 1 depicts an exploded perspective view of a disk drive capable of including an embodiment of the invention. The disk drive 100 includes a head disk assembly (HDA) 104 and a printed circuit board assembly (PCBA) 102. The PCBA includes conventional circuitry for processing signals and controlling the operations of the disk drive. The HDA 104 includes a base 108 and a cover 110 attached to the base 108 to collectively house at least one disk 150, 152, a spindle 130 attached to the base 108 for rotating the disk(s) 150, 152, and a head stack assembly (HSA) 120 rotably attached to the base 108.

In the embodiment of FIG. 1, disk 150 is separated from disk 152 by spacer ring 156. The cover 110 may include an opening for a breather filter 116 and a covering 118 for a larger opening for use in servo writing the disks. The base 108 is typically attached to the cover 110 by means of screws or other discrete fasteners. The disk 150 may be mounted to the spindle 130 by a disk clamp 160. The spindle 130 rotates the disks 150, 152 at a constant angular velocity about a spindle rotation axis 134.

Figure 2:
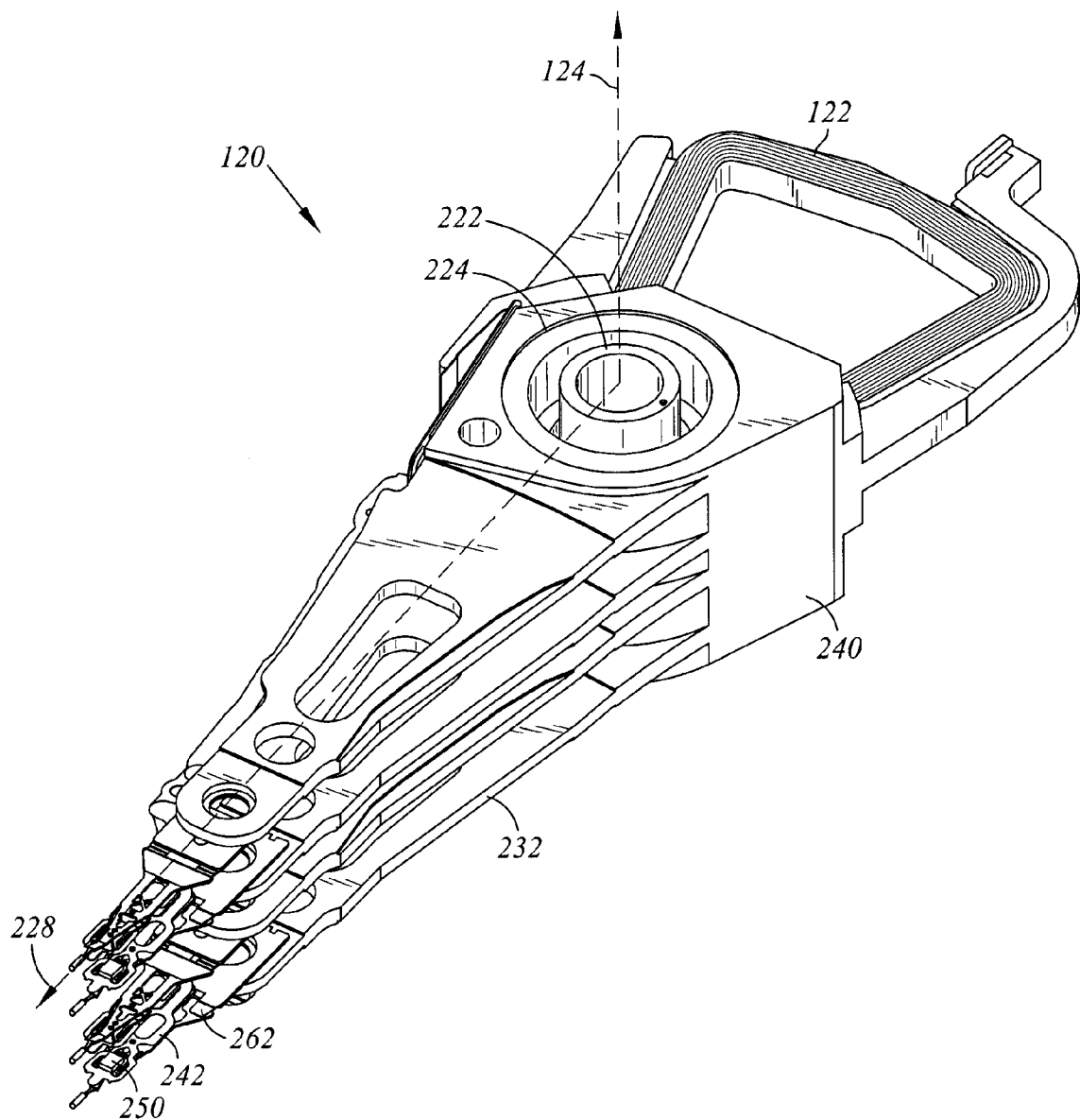
FIG. 2 depicts a head stack assembly capable of including an embodiment of the invention.

Now referring additionally to FIG. 2, the HSA 120 comprises a swing-type or rotary actuator 240, at least one head gimbal assembly (HGA), e.g. HGA 242. The HGA 242 includes a suspension assembly 262 which supports a head 250 for writing and reading data to and from a surface of an adjacent disk (e.g. disk 152). In magnetic recording hard disk drive applications, the head 250 may include a magneto resistive sensor for reading data, and a longitudinal or perpendicular type inductive transducer for writing data. In optical or magneto-optical recording applications, the head may include an objective lens for focusing laser light upon the recording media surface. The storage capacity of the disk drive 100 may be increased by the use of additional disks and by the HSA 120 having correspondingly more HGAs supported by multiple actuator arms.

The rotary actuator 240 includes a pivot bore 224 for receipt of pivot-bearing cartridge 222. In certain embodiments, the actuator 240 may be fabricated of a metal material such as aluminum, stainless steel, magnesium, beryllium, or an alloy thereof, by casting and/or forging. At least one actuator arm (e.g. actuator arm 232) is cantilevered from the actuator 240, and defines an arm longitudinal axis 228. A coil 122 is cantilevered from the actuator 240 in a direction that is generally (but not necessarily exactly) opposite from the actuator arm 232.

The HSA 120 is rotably affixed to the base 108 via a pivot-bearing cartridge 222 mounted through the pivot bore 224 of the actuator 240 of the HSA 120, so that the pivot axis 124 of the HSA 120 is substantially parallel to the spindle rotation axis 134. A voice coil motor (VCM) includes bottom and top VCM plates 142, 146 mounted to the base 108. One or both of the VCM plates includes a permanent magnet (e.g. permanent magnet 140) and the VCM plates 142, 146 form a yoke to carry magnetic flux from the permanent magnet(s). The coil 122 of the actuator 240 is disposed between the bottom and top VCM plates 142 and 146 to cause pivoting of the HSA 120 about the pivot axis 124 defined by the pivot bearing cartridge 222 in response to an electrical current passed through the coil 122. In this way, the VCM controllably positions the head(s) of the HSA 120 relative to the disks 150, 152 for writing and/or reading data. The angular range of HSA pivoting may be limited by one or more stops, and the HSA may be held adjacent a stop by a latch (e.g. actuator latch 170).

Now referring additionally to FIGS. 3-7, suspension assembly 262 has been fabricated according to an embodiment of the invention. According to step 702, a first thinned area 410 of a load beam 306 is partially etched, for example by wet chemical etching. According to step 714, the suspension assembly 262 includes a mounting plate 302, a bend region 304, and the load beam 306. The load beam 306 may comprise stainless steel, for example. According to step 726, a constrained-layer damper 620 is applied to the first thinned area 410 of the load beam 306. In certain embodiments the load beam is preferably partially etched by 40% to 80% of its full thickness in the first thinned area 410. In certain embodiments this thickness range enables adequate strain energy to be imparted to the constrained layer damper 620. Preferably, the first thinned area 410 is at least one-fifth of a total area of the load beam 306 but no more than four-fifths of a total area of the load beam 306, since this allows for adequate damping in certain embodiments.

Note that in the embodiment of FIGS. 3-7, the bend region 304 does not include any of the first thinned area 410 and therefore the constrained-layer damper 620 is not attached to the bend region 304. This may significantly improve the stability and repeatability of dynamic properties of the suspension assembly 262, because the mechanical properties of the constrained-layer damper 620 may change with temperature far more than other components of the suspension assembly 262, for example because the constrained-layer damper 620 preferably includes a viscoelastic material. If the constrained-layer damper 620 were positioned on the bend region 304, then the larger temperature dependence of the mechanical properties (e.g. stiffness) of the viscoelastic material of the constrained-layer damper 620 might unacceptably affect the stability and repeatability of the mechanical properties of the bend region 304.

Alternatively, if the load beam 306 did not include a first thinned area 410, and/or the constrained-layer damper 620 were positioned on a non-thinned area of the load beam 306, then the amount of damping provided by the constrained-layer damper 620 may be inadequate for lack of strain energy imparted to the viscoelastic material of the constrained-layer damper 620. Accordingly, in the embodiment of FIGS. 3-7, the existence and location of the first thinned area 410, and the constrained-layer damper 620, combine to ensure both adequate damping and stability of the mechanical properties of the suspension assembly 262.

Figure 8:
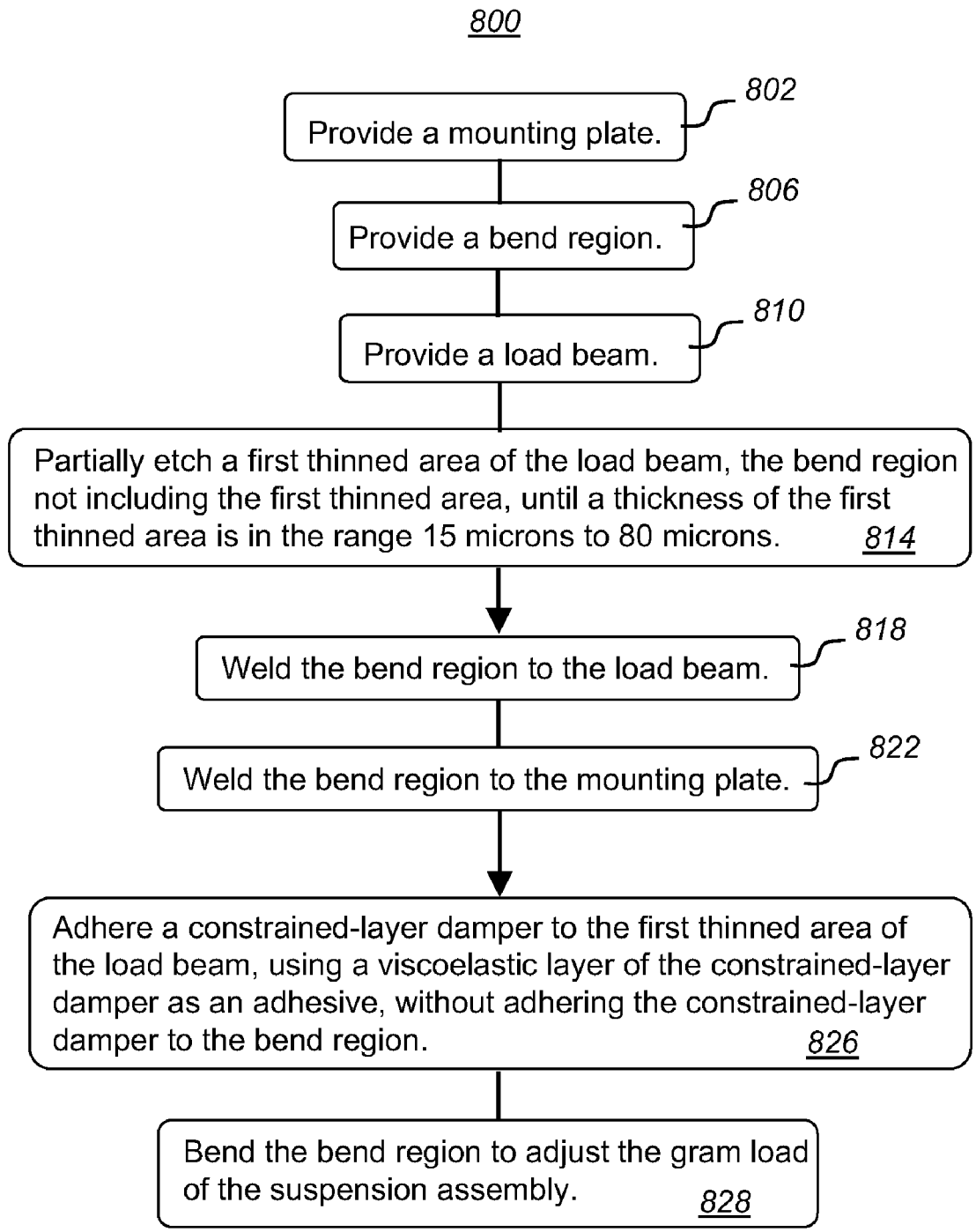
FIG. 8 is a flow chart of a method according to another embodiment of the invention.

FIG. 8 is a flow chart of a method according to another embodiment of the invention. Referring now to FIGS. 3-6, and 8, According to step 802 a mounting plate 302 is provided. According to step 806, a bend region 304 is provided. According to step 810, a load beam 306 is provided. According to step 814, a first thinned area 410 of the load beam 306 is partially etched, for example by wet chemical etching, and the partial etching is continued until a thickness of the first thinned area is in the range 15 microns to 80 microns. In certain embodiments this thickness range enables adequate strain energy to be imparted to the constrained layer damper 620. According to step 818, the bend region 304 is welded to the load beam 306. According to step 822, the bend region 304 is welded to the mounting plate 302. In steps 818 and 822, the welding may, for example be spot welding and/or laser welding. In the embodiment of FIG. 8, the welding steps 818 and 822 preferably take place after (though not necessarily immediately after) the partial etching of step 814, as signified by the head of the arrow between steps 814 and 818.

Still referring to the embodiment of FIG. 8, according to step 826 a constrained-layer damper 620 is applied to the first thinned area 410 of the load beam 306. The constrained-layer damper 620 may include a damping layer 624 and a constraining layer 622. Preferably, the damping layer 624 comprises a viscoelastic material. The constraining layer 622 preferably comprises a material with a considerably higher stiffness than the damping layer 624, such as stainless steel, polyimide, or polyester. Preferably, the damping layer 624 defines a damping layer thickness in the range 25 microns to 125 microns. Preferably, the constraining layer 622 defines a constraining layer thickness in the range 10 microns to 125 microns. In step 826, constrained-layer damper 620 is adhered to the first thinned area 410 of the load beam 306 using the damping layer 624 as an adhesive.

In the embodiment of FIG. 8, the adherence in step 826 preferably takes place after (though not necessarily immediately after) the welding steps 818 and 822, as signified by the head of the arrow between steps 814 and 818. In step 828 the bend region 304 is bent to adjust the preload (also known as "gram load") of the suspension assembly 262. Such bending of the bend region 304 optionally takes place after the welding steps 818 and 822.

Note that in the embodiment of FIGS. 3-6, and 8, the bend region 304 does not include any of the first thinned area 410, and so the constrained-layer damper 620 is not adhered to the bend region 304. This may improve the repeatability of dynamic properties from part-to-part in a manufacturing lot of suspension assemblies, because the placement of the constrained-layer damper 620 may have a larger engineering uncertainty in relative position than other components of the suspension assembly, such as the relative position of the load beam 306 relative to the bend region 304. This may also significantly improve the stability and controllability of dynamic properties of the suspension assembly 262, because the mechanical properties of the constrained-layer damper 620 may change with temperature far more than other components of the suspension assembly 262, for example because the constrained-layer damper 620 preferably includes a viscoelastic material. If the constrained-layer damper 620 were positioned on the bend region 304, then the larger temperature dependence of the mechanical properties (e.g. stiffness) of the viscoelastic material of the constrained-layer damper 620 might unacceptably affect the stability and repeatability of the mechanical properties of the bend region 304.

Alternatively, if the load beam 306 did not include a first thinned area 410, and/or the constrained-layer damper 620 were positioned on a non-thinned area of the load beam 306, then the amount of damping provided by the constrained-layer damper 620 may be inadequate. Accordingly, in the embodiment of FIGS. 3-6, and 8, the existence, size, thickness, and location of the first thinned area 410 and the constrained-layer damper 620 combine to ensure both adequate damping and adequate repeatability, stability, and controllability of the mechanical properties of the suspension assemblies.

Figure 3:
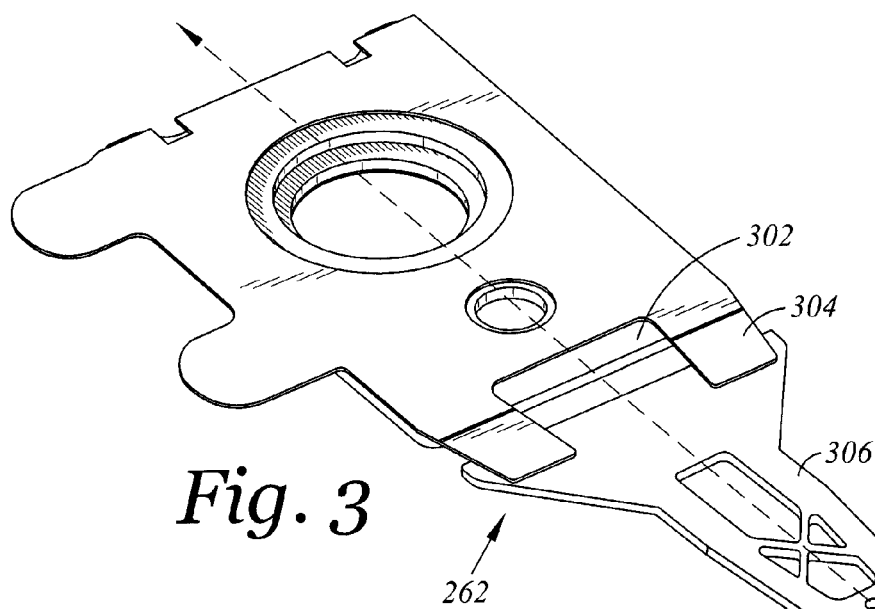
FIG. 3 is a bottom perspective view of a suspension assembly according to an embodiment of the invention.
Figure 4:
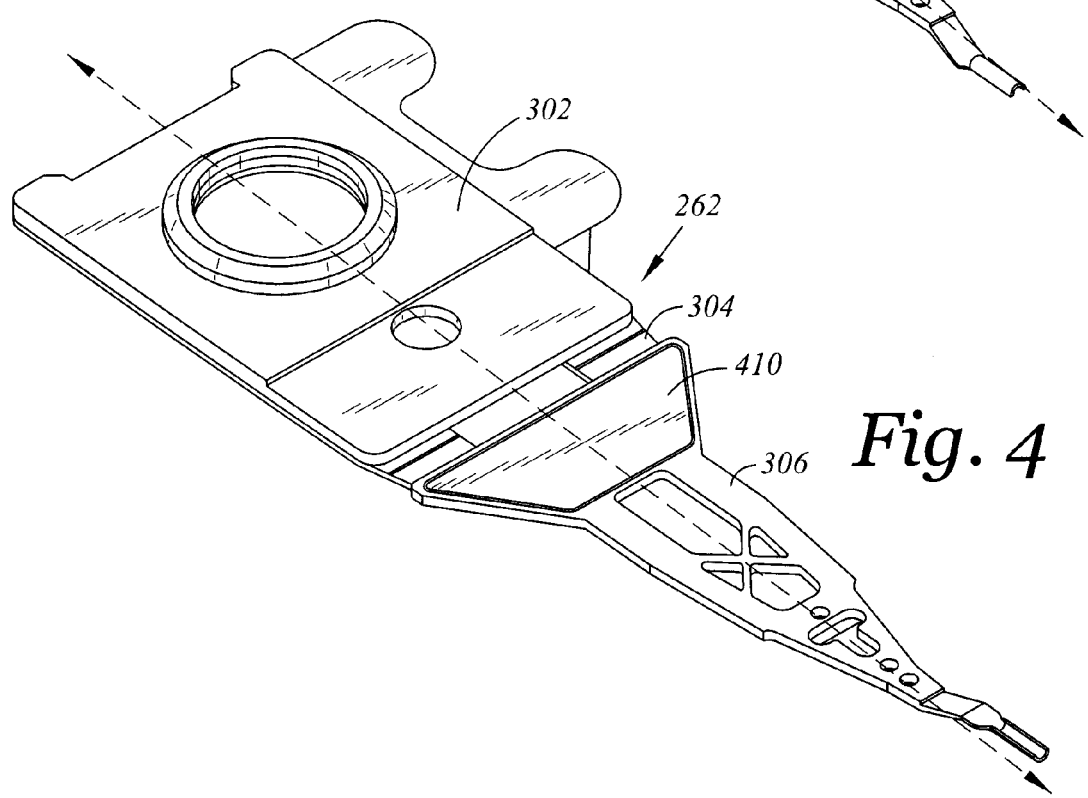
FIG. 4 is a top perspective view of a suspension assembly according to an embodiment of the invention.
Figure 5:
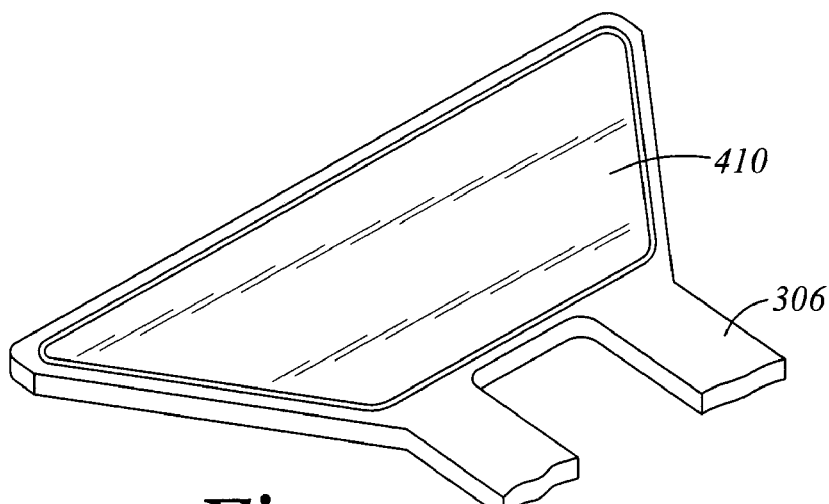
FIG. 5 is a top perspective view of a portion of a load beam according to an embodiment of the invention.
Figure 6:
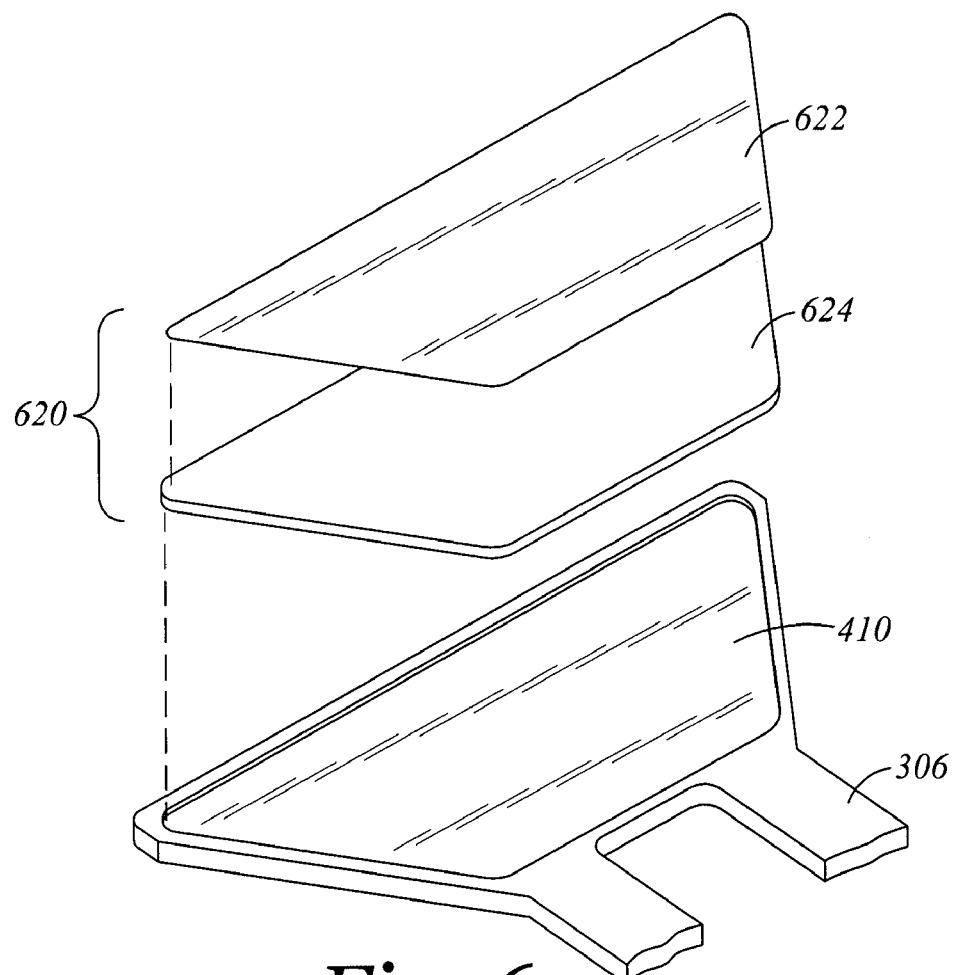
FIG. 6 is an exploded top perspective view of a portion of a load beam according to an embodiment of the invention.

Although FIG. 3 depicts an embodiment where the bend region and the load beam are separately formed and then subsequently welded together, the bend region and the load beam may alternatively be formed together from the same sheet so as to be integrally joined. The bend region may optionally include its own partially-etched region, for example to enhance its compliance, which we may refer to as a second thinned area. However, the constrained-layer damper 620 in the embodiment of FIG. 7 will not be adhered to the bend region, and therefore will not be adhered to such a second thinned area (which has a different location and purpose than the first thinned area of the load beam).

In the foregoing specification, the invention is described with reference to specific exemplary embodiments thereof, but those skilled in the art will recognize that the invention is not limited thereto. Various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to have an open-ended interpretation.

I claim:

1. A method to fabricate a damped suspension assembly, the method comprising:
   partially etching a first thinned area of a load beam;
   providing a suspension assembly including the load beam, a bend region, and a mounting plate, the bend region not including the first thinned area;
   adhering a constrained-layer damper to the first thinned area of the load beam without adhering the constrained-layer damper to the bend region.

2. The method of claim 1 wherein providing a suspension assembly further comprises welding the bend region to the mounting plate.

3. The method of claim 2 wherein welding comprises spot welding.

4. The method of claim 1 wherein providing a suspension assembly further comprises separately forming the bend region and forming the load beam, and welding the bend region to the load beam.

5. The method of claim 4 wherein welding comprises laser welding.

6. The method of claim 1 wherein the bend region and the load beam are formed together from the same sheet so as to be integrally joined.

7. The method of claim 1 wherein the bend region includes a second thinned area, and the constrained-layer damper is not adhered to the second thinned area.

8. The method of claim 1 wherein the load beam comprises stainless steel.

9. The method of claim 8 wherein partially etching is continued until a thickness of the first thinned area is in the range 15 microns to 80 microns.

10. The method of claim 1 wherein partially etching is continued until the load beam in the first thinned area has been etched by an amount in the range of 40% to 80% of a full thickness of the load beam.

11. The method of claim 1 wherein the constrained-layer damper includes a damping layer and a constraining layer, and adhering comprises using the damping layer as an adhesive.

12. The method of claim 11 wherein the constraining layer comprises a material selected from the group consisting of stainless steel, polyimide, and polyester.

13. The method of claim 12 wherein the constraining layer defines a constraining layer thickness in the range 10 microns to 125 microns.

14. The method of claim 11 wherein the damping layer comprises a viscoelastic material.

15. The method of claim 14 wherein the damping layer defines a damping layer thickness in the range 25 microns to 125 microns.

16. The method of claim 1 wherein the first thinned area is at least one-fifth of a total area of the load beam but no more than four-fifths of a total area of the load beam.

17. The method of claim 1 wherein partially etching comprises wet chemical etching.

* * * * *